INVENTORS
JAMES S. TAPP
ROBERT E. COLWELL
MYRON K. TONEY

ATTORNEY

United States Patent Office 3,661,864
Patented May 9, 1972

3,661,864
METHOD OF PRODUCING CONTROLLED-FORM PRECIPITATES
James S. Tapp, Kettering, Ohio, Robert E. Colwell, Simsbury, Conn., and Myron K. Toney, Greenwood, S.C., assignors to Monsanto Company, St. Louis, Mo.
Filed Mar. 19, 1969, Ser. No. 808,605
Int. Cl. C08f *3/74;* C08g *20/38*
U.S. Cl. 260—78 S                             3 Claims

ABSTRACT OF THE DISCLOSURE

Precipitates of controlled morphology are produced by subjecting a pregnant solution and a precipitant to centrifugal action whereby controlled amounts of the solution and precipitant are thrown into random contact causing a precipitate to form; then by collecting and separating the precipitate from the excess of the solution and precipitant.

---

This invention relates to methods of producing precipitates of controlled morphology, and more particularly polymeric precipitates of various shapes.

Synthetic materials with a pronounced resistance to degradation by heat and by electrical discharge are enjoying wider use in many commercial applications, such as dielectrics, reinforcements, non-woven, synthetic leather, coating, composites and the like. In many cases, the performance of a product is largely dependent upon its physical form as well as its composition. Usually particulate form is controlled under conditions of high shear as, for example, in U.S. Pat. 2,342,387 which teaches the production of polymeric granules.

It has been found that particulate materials, and particularly of synthetic polymers can be produced under conditions of low shear by the method of this invention, and that such particulate materials are useful in the preparation of colorable shaped objects, non-wovens, textiles, friction surfaces, laminates, and the like. It has also been found that by varying slightly the conditions under which this invention is practiced, morphological structures of these particulate materials can be controlled. Various material structures include (1) spheroidal particles, (2) fiberlike ligaments, and (3) sheets or films, all of which have broad utility in the field of composites. For example, spheroids are well-suited in composite molding, ligaments are useful as binders in thin-sheet composites, and sheets are popular in thermal or electrical insulating composites.

The method of this invention can be applied to any precipitation system, but is especially suitable for polymer systems comprising a polymer solution and a non-solvent which will yield a precipitate. These systems include polyamides, acrylics, ordered temperature resistant polyamides, and the like.

It is an object of this invention to provide a method whereby precipitates and particularly polymeric precipitates of controlled morphology can be produced.

It is a second object of this invention to produce generally spheroidal polymeric particles;

It is yet another object of this invention to produce random-shaped fiber-like polymeric ligaments;

It is yet another object of this invention to produce random-shaped polymeric sheets or films.

Briefly, the objects of this invention are accomplished by centrifuging a pregnant polymeric solution and a precipitant in such a manner that controlled amounts of each are thrown into contact within a container, and thereafter by separating the precipitate from the excess of the solution and the precipitant.

To obtain precipitates of controlled morphology, any pregnant solution can be used which precipitates rapidly and which produces a precipitate which will hold, to some extent at least, its initial shape and form. Particularly suitable to the practice of this invention are polymeric structures such as the polyamides, polyesters, acrylics, and the like. By subjecting both solutions and precipitant to centrifugal action in such a manner as to permit the emeregnce of small amounts of both precipitant and solution to converge in random fashion, the precipitate of this invention is formed. The morphology of the precipitates will vary, of course, with the viscosity and concentration of the solution, the speed of centrifuge, the distance of travel, and the angle of travel of the small amounts of both solution and precipitant, etc. In any given apparatus for the practice of this invention, the effect of these variables must be individually determined; appropriate adjustments being made for desired results.

To further understand the invention, reference will be made to the attached drawing that forms a part of the present application.

Figure 1:
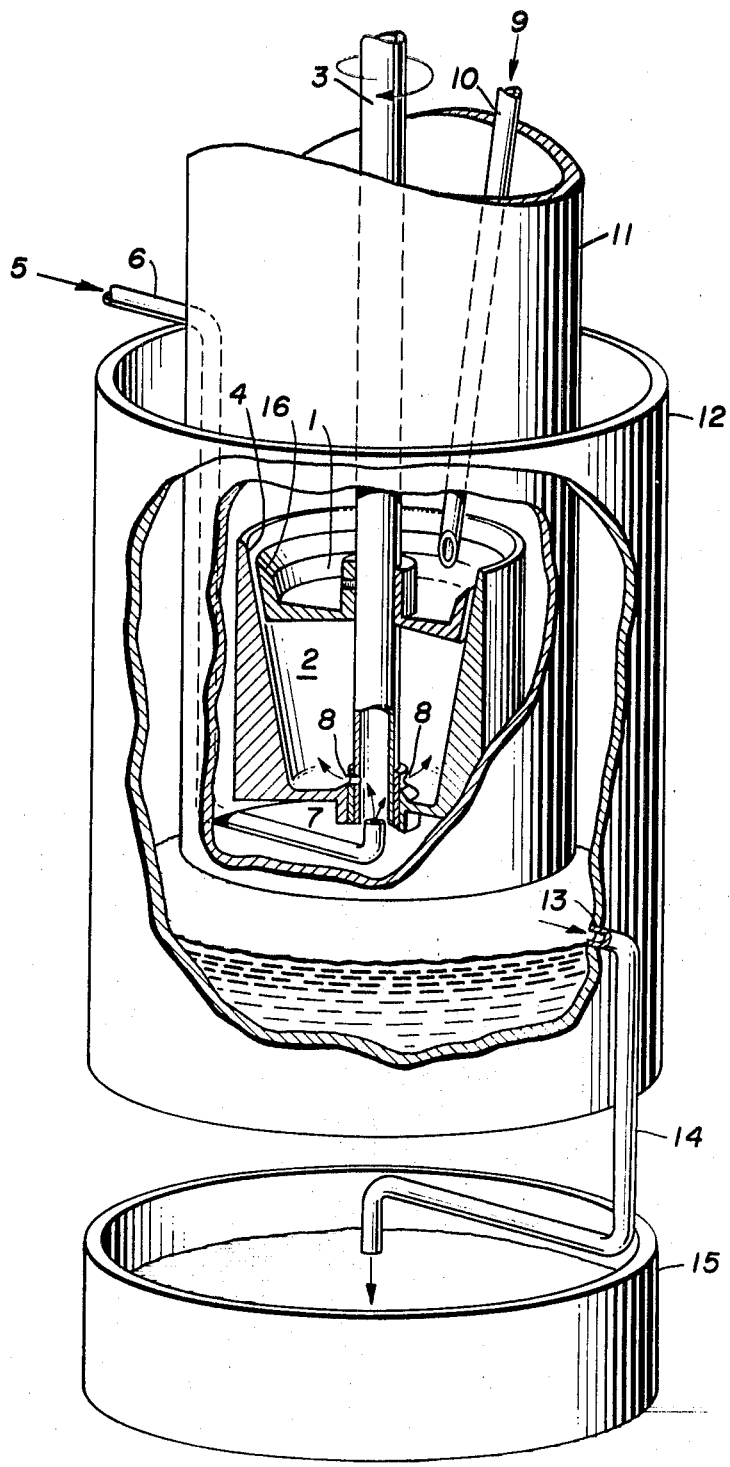
FIG. 1 is a perspective view of an apparatus which is suitable for the practice of this invention.

Referring now in detail to FIG. 1, containers 1 and 2 are coaxially mounted on shaft 3, their conical lips being represented by numerals 16 and 4, respectively. Container 2 is fed from supply source 5 through tube 6, through the hollowed out portion of shaft 3 designated as numeral 7, and through apertures 8. Container 1 is fed from supply source 9 through tube 10. The containers are surrounded by sleeve 11 which projects high enough to control splashing and splattering within the device. The major portion of sleeve 11 is surrounded by vessel 12 which is provided with overflow aperture 13. Connected with the overflow aperture is overflow tube 14 which provides conduit means to filtration unit 15.

In the operation of this device, shaft 3 rotates at a speed which in conjunction with variables including the composition of the solution and precipitant, and the rate of feed thereof, is adjusted to produce the morphology desired of the precipitate which is formed generally at the point, and beyond the point where random amounts of the precipitant and the solution meet within the sleeve. Besides the speed of rotation, the clearance between the outside of container 1 and the inside of container 2, where container 1 is disposed within container 2, and in any case, the location of the point of intersection of hypothetical extensions of cone-shaped lips 4 and 16, may be critical to the morphology of the precipitate. These are variables, but it is always essential that there is concentric uniformity of spacing between the containers so as to provide a balanced precipitating system.

EXAMPLE I

Figure 2:
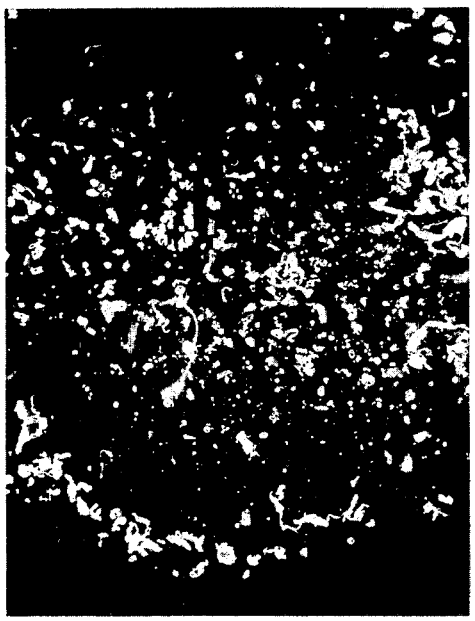
FIGS. 2–10 show the morphological structure of the precipitates described in Examples 1–9.

A 10% solution of poly-m-phenylene-bis(m-benzamide) terephthalamide with an inherent viscosity of 1.04 in dimethyl acetamide (DMAC) was charged to a reservoir and was pumped at about 200 ccs. per minute into the inner rotating cup 1 of the apparatus shown in FIG. 1. The precipitant, water, was pumped through the shaft at the bottom of outer cup 2, at a rate of about 2600 ccs./minute. The shaft 3, of the cup was rotated at about 8200 r.p.m. The inner and outer cups were mounted concentrically on the same shaft and rotated at the same angular velocity at all times. The polymer solution was fed near the center of the inner cup and was propelled outward and upward over the edge onto the precipitant traveling up the wall of the outer cup. The solution and precipitant emerged from the edges of the cups in shot (free) form and contacted one another at about the same velocity and direction and remained in contact over a small but appreciable distance. The spacing between the edge of the inner cup and the wall of the outer cup was about 0.25 inch. The distance between the inner cup lip and the precipitant was reduced by the film thickness of the water on the wall of the outer cup at the instant of contact between polymer solution and precipitant. As the precipitating polymer traveled outward and horizontally on the sheet of precipitant and DMAC, it impinged a vertical wall of water traveling downward within the circumscribing sleeve 11. The synthetic precipitated polymeric spheroids were kept in suspension by agitating in vessel 12 beneath the precipitating apparatus and were permitted to escape to filtration unit 15 through the overflow 14. The product was collected from the filter, washed and dried prior to subsequent preparation of a shaped object. The morphological structure of the product is shown at FIG. 2 under a magnification of 13×. It can be seen that the particles are principally spheroidal in shape. They are highly useful in the preparation of composite molded objects, especially when high temperature resistance is desired, and may be made by conventional molding techniques.

EXAMPLE II

Except as noted below, all steps were identical with Example I.

Dope composition

13% by weight of poly-m-phenylenebis(m-benzamide)-terephthalamide in DMAC containing 5% LiCl
Inherent viscosity in 95/5 DMAC/LiCl=1.04
Viscosity=16 poises at room temperature.

Precipitating conditions

Polymer solution feed rate=14.4 cc./minute
Cup speed—1200 r.p.m.

Figure 3:

The morphological structure of this product is shown in FIG. 3 under a magnification of 13×. The particles are principally filamentary in form having broad utility as a binder in making thin sheets, such as paper.

EXAMPLE III

Figure 4:

The polymer dope composition was the same as in Eample II. The precipitation method was identical with Example I, except that the polymer solution feed rate was 200 ccs./minute and the cup speed was 2000 r.p.m. The morphology of this precipitate is shown in FIG. 4 under the magnification of 13×. Although the product formed initially as a thin film, it was subsequently deformed and rolled randomly, resulting in an entirely different form from that of Examples I and II. This product has broad utility in the field of high-temperature resistant composites.

EXAMPLE IV

The method and apparatus was the same as in Example I. Dope composition and precipitation conditions were as follows:

Dope composition

9% polyacrylonitrile in DMAC
Brookfield viscosity=3 poises

Precipitation conditions

Figure 5:
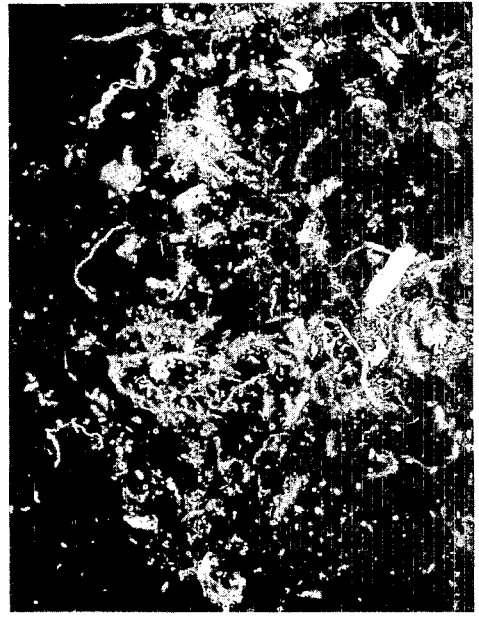

Dope feed rate=200 cc./minute
Cup speed=8200 r.p.m.
Inner cup clearance=0.25 inch
Precipitant composition=68/32 $H_2O$/DMAC (wt.)
Precipitant feed rate=2600 cc./minute The product of this example is shown in FIG. 5 under a magnification of 13×. The product morphology is principally filamentary and is very desirable for making thin sheets. A hand-sheet was made by mixing the product of this example with ¼ inch polyacrylonitrile flock in a weight ratio of 70% of the filamentary product to 30% of the flock. The equivalent of 4 grams dry weight of the binder's stock was charged to the tank of a standard sheet machine (Herman Manufacturing Company hand sheet machine) which had been modified by placing a removable wire screen over the standard screen in the bottom of the sheet machine tank. The remainder of the sheet machine tank was filled with water, and the slurry was agitated to maintain a good dispersion. Agitation was stopped and the drain cock of the machine was opened, draining the slurry through the screen and forming the sheet on the removable wire screen. The sheet and screen were removed from the machine together. The sheet was uniform and was found to have a dielectric strength of 204 volts/mil and a Mullen Burst Strength of 10 p.s.i. Mullen Burst Strength is a standard test designated by the American Society of Textile Manufacturers as ASTM D–774–63T. A paper sample is placed over a rubber diaphragm in the specimen holder and clamped securely. Hydrostatic pressure is increased against the rubber diaphragm at a controlled rate so that the paper sample bulges until it ruptures. The hydrostatic pressure required to rupture the sample is reported as the test result.

Dielectric strength, as reported herein, is a slight modification of the standard ASTM D–149–61, in which electrodes used are ¼″ in diameter rather than 2-inches as in the standard test. The paper sample is placed between the electrodes and the voltage is increased from zero to breakdown at a uniform rate. The thickness of the sample is measured and the dielectric strength is reported in volts/mil.

EXAMPLE V

Figure 6:
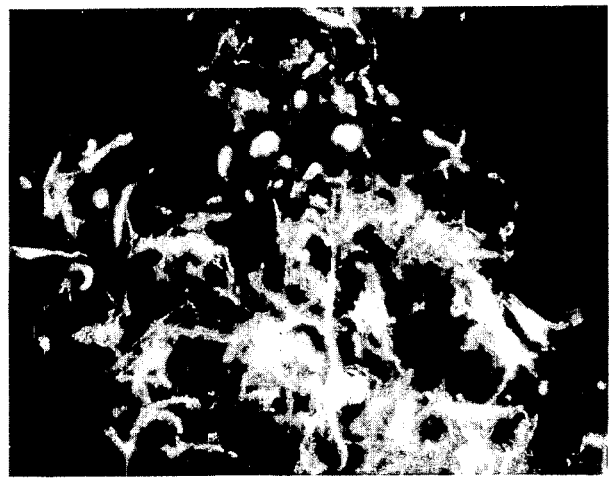

A low viscosity dope was prepared by adding 50 grams of nylon 66 chips to 500 milliliters of 98–100% formic acid. The polymer had a relative viscosity of 38 and contained 0.02% $TiO_2$. Five grams of finely divided $SiO_2$ was added to thicken the dope. The process was conducted as in Example I, except that the precipitation conditions were as in Example IV. The product was a fibrous web and is shown at FIG. 6 under a magnification of 60×. The product was combined with nylon flock and a hand sheet was made in Example IV.

EXAMPLE VI

A solution containing 11% poly-m-phenylene-bis(m-benzamide) terephthalamide in DMAC/$H_2O$/$CaCl_2$=93/4/3 was the polymer solution. It had an inherent viscosity of 2.0 in 5% lithium chloride in DMAC, and a Bookfield viscosity of 150 poises. The process was operated under the following conditions:

Dope feed=200 cc./minute
Cup speed=3000 r.p.m.
Clearance=0.25 inch
Precipitant solution feed=2600 cc./minute
Precipitant solution=$H_2O$/DMAC—68/32

Figure 7:

The product is shown in FIG. 7 under a magnification of 13×. The morphological structure is principally a ribbon-like material suitable as a binder for rigid composite structures.

EXAMPLE VII

Figure 8:
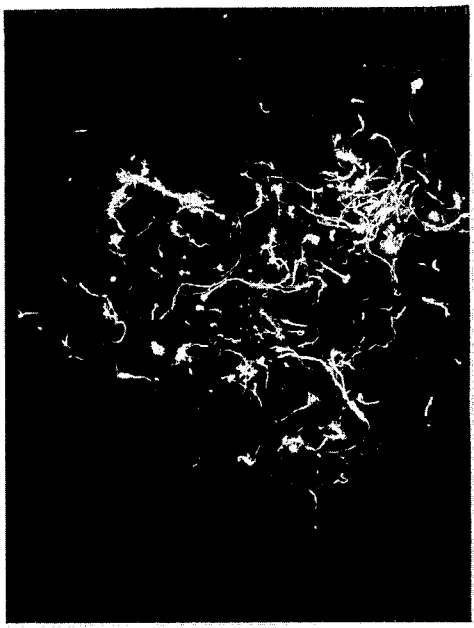
Figure 9:
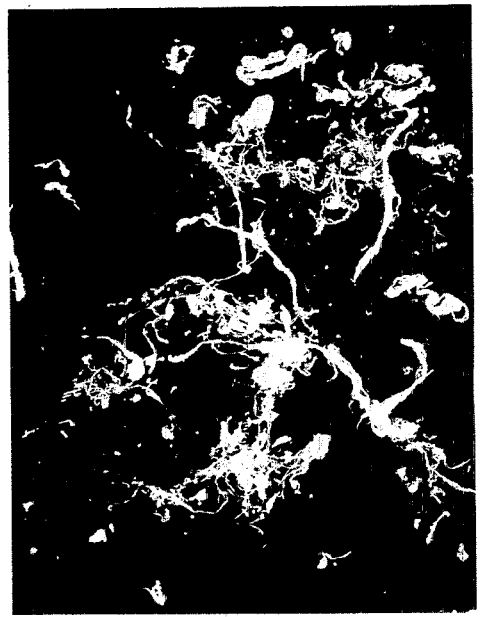

The polymer composition and precipitant of Example VI was processed under the following conditions:

Dope feed=50 ccs./minute
Cup speed=8200 r.p.m.
Clearance=0.25 inch.
Precipitant solution feed—2600 ccs./minute The product is shown at FIG. 8 under a magnification of 13×. The fibers were fine, similar to those of Example II, although different polymer solution and precipitant was employed.

EXAMPLE VIII

Precipitation was conducted as in Example I, except as follows:

Dope composition

13% poly-m-phenylenebis(m-benzamide)terephthalamide in DMAC with an inherent viscosity of 1.04 in 95/5 DMAC/LiCl
Brookfield viscosity—16 poises at 22–23° C.

Precipitation conditions

Dope feed=200 ccs./minute
Cup speed=8200 r.p.m.
Clearance—0.25 inch.
Precipitant solution feed=2600 ccs./minute
Precipitant composition=$H_2O$ The product is shown at FIG. 6 under a magnification of 13×. It comprises a random mixture of spheroids, fibers, and ribbons. The conditions show a balancing of polymer solution properties against processing conditions to obtain the random structures.

EXAMPLE IX

The polymer composition and precipitant were identical with that of Example II. Precipitation conditions were as follows:

Precipitation conditions

Figure 10:

Dope feed=748 ccs./minute
Cup speed=2000 r.p.m.
Clearance=0.25 inch
Precipitant solution feed=2600 ccs./minute Unlike the fibers produced in Example II, these fibers (FIG. 10) were longer in length and larger in diameter. They were formed from fiber that rolled during coagulation which resulted from precipitating a relatively thick dope, film or sheet.

When using a device such as that depicted in FIG. 1, it may be desirable to provide wetting means for the interior surface of sleeve 11 in order to prevent accumulations of the precipitate thereon. Although not shown in the figure, this can be accomplished by directing flow of the precipitant either downwards from the top of the sleeve along the interior surface, or upwards from the bottom of the sleeve. The source of the precipitant for the wetting of the interior of the sleeve may be a recirculation of the precipitant from filtration unit 15; or a fresh supply may be used.

It is understood that the examples given in the specification are intended only by way of illustration, and that they may be modified in many details without departing from the spirit of the invention.

We claim:

1. The method of producing a polymeric precipitate of controlled morphology comprising: (1) subjecting a dimethyl acetamide solution of a high molecular weight polymer selected from the group consisting of polyacrylonitrile and polycarbonamide, and a precipitant to said solution comprising water, said solution and said precipitant being in separate containers, to coaxial and concurrent centrifugal action sufficient to eject both solution and precipitant from said containers, whereby amounts of said solution and said precipitant sufficient to provide a polymeric precipitate are concentrically ejected from each of said containers into random contact, thereby causing a polymeric precipitate to form, (2) collecting said precipitate and the excess of the said precipitant and said solution and (3) separating by filtration said precipitate from the excess of said precipitant and said solution.

2. The method of claim 1 wherein the polyacrylonitrile solution is about 9% by weight of polyacrylonitrile.

3. The method of claim 1 wherein the polycarbonamide solution consists of about 13% of weight of poly-m-phenylenebis(m - benzamide)terephthalamide in dimethyl acetamide.

References Cited

UNITED STATES PATENTS

| | | | |
|---|---|---|---|
| 2,977,342 | 3/1961 | Twitchett et al. | 260—78 |
| 2,988,782 | 6/1961 | Parrish et al. | 260—78 |
| 3,219,601 | 11/1965 | Koontz | 260—78 |
| 3,232,910 | 2/1966 | Preston | 260—78 |
| 3,431,242 | 3/1969 | Waters et al. | 260—78 |
| 2,810,646 | 10/1957 | Wooding et al. | 260—88.7 B |
| 2,862,895 | 12/1958 | Cummings et al. | 260—88.7 B |
| 3,042,970 | 7/1962 | Terenzi | 260—88.7 B |
| 3,056,676 | 10/1962 | Hendricks | 260—88.7 B |
| 3,275,612 | 9/1966 | Bechtold | 260—88.7 B |
| 3,493,648 | 2/1970 | Griffith | 260—88.7 B |

HAROLD D. ANDERSON, Primary Examiner

U.S. Cl. X.R.

260—78 A, 88.7 B, 96 R